United States Patent Office 2,694,217
Patented Nov. 16, 1954

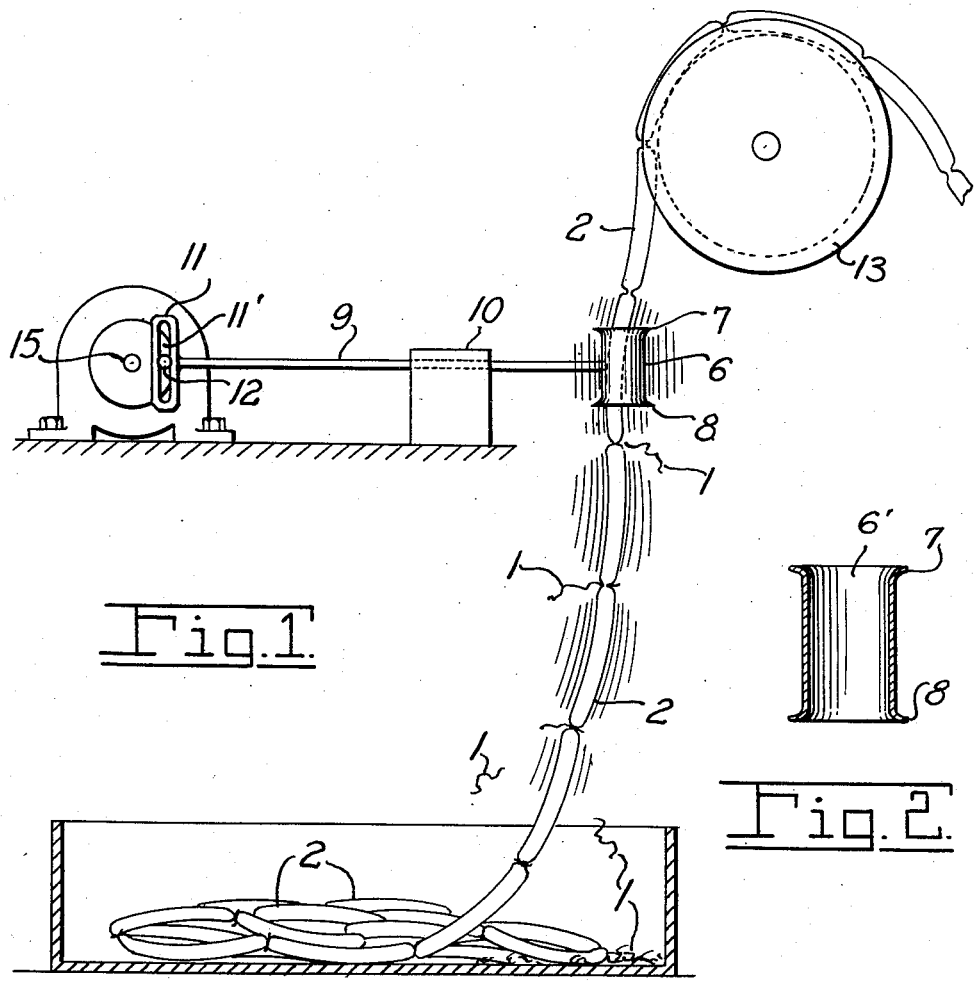
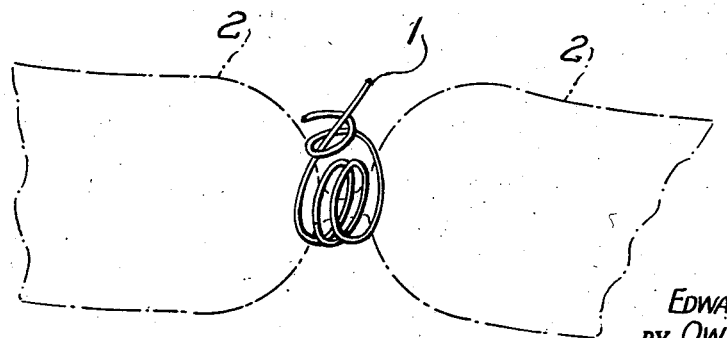

2,694,217
MACHINE FOR DESTRINGING LINK MEAT PRODUCTS

Edward G. Anderson and Owe M. Toennies, Cincinnati, Ohio, assignors to The E. Kahn's Sons Company, Cincinnati, Ohio, a corporation of Ohio Application July 29, 1953, Serial No. 370,963

4 Claims. (Cl. 17—1)

This invention relates to a machine for de-stringing chains or strings of link meat products such as sausage, wieners, frankfurters and the like.

An object of this invention is to provide a simple, efficient means for removing the tie strings of link meat products such as sausage, wieners, frankfurters and the like.

Another object of this invention is to provide a machine which will effectively de-string chains of link meat products without bruising or otherwise damaging the casings or contents thereof.

A further object of the invention is to provide a reciprocating hollow member through which link meat products are passed, the product being thereby so whipped that the strings become untied and drop off.

A still further object of this invention is to provide a device of the above character, through which chains of link meat products may be passed with minimum resistance, thereby avoiding damage to the casings or contents thereof.

From the following description and the accompanying drawing, the above and other objects and features of this invention will be apparent to those having ordinary skill in the art to which it pertains.

In the drawings:

Figure 1 is a view in side elevation of a machine embodying this invention, and showing it in operation, de-stringing a chain of link meat products, with the supply pan shown in section;

Fig. 2 is an enlarged view in vertical section of the throat through which the chain of sausages passes during de-stringing; and Fig. 3 is an enlarged view showing a tie-string separating adjacent links of meat product in a casing.

Link meat products, such as wieners, frankfurters and the like, are made by stuffing about forty-foot, or longer, lengths of casing, with a suitable meat preparation, and tying strings about the casing at regular intervals to form a plurality of separate, connected links, which tying operation is frequently referred to as "linking with string."

In the drawing, a preferred form of the de-stringing device is illustrated in Fig. 1. The device comprises a hollow, cylindrical member 6, also shown in Fig. 2, having smoothly rounded or flared ends 7 and 8. The hollow member 6 is mounted for reciprocation on a slide rod 9, mounted in a slide bearing 10. A plate 11 is secured to one end of slide rod 9. A slot 11' is provided in plate 11, extending perpendicular to the axis of slide rod 9. Slot 11' is adapted to receive crank 12. The crank 12 is mounted on a rotating member such as a jack shaft or motor shaft 15. If desired, an anti-friction bearing, or suitable bearing material, may be incorporated in crank 12, to provide improved mechanical cooperation between crank 12 and slotted plate 11. The length of cylindrical member 6 and the rounded ends 7 and 8, is less than the length of a link of meat product 2 in a chain of links, as shown in Fig. 1. A diameter of bore 6' of hollow member 6 is larger than the diameter of links 2, which are passed therethrough.

In use, a chain of links of meat product, such as wieners, frankfurters and the like, is passed through the bore of hollow member 6 and the rounded ends 7 and 8, by means of a pulley 13 or other suitable device. As the chain of links moves through the member 6 and the rounded-flared ends 7 and 8, while the member 6 is being reciprocated, a whipping action is imparted to the chain of links, whereby the tie strings 1, tied as shown in Fig. 3, are loosened and drop off. It is usual that some tie-strings 1 on a chain of link meat products are more resistant to loosening than others. Often a bit of meat product smeared on a string, causes such resistance. The operator can inspect the chain of link meat product as it passes out of throat 6, and regulate the speed and direction of advance of the chain so as to effect removal of all tie-strings 1 before the chain has passed out of throat 6.

It has been found that a reciprocating device such as shown, effectively removes the tie strings 1 when the stroke of the cylindrical member 6 is of the order of three to four inches, and the number of reciprocation cycles, comprising one stroke in each direction, is of the order of 340 to 540 reciprocations per minute. The stroke and the number of reciprocations given the cylindrical member 6, of course, will be adjusted to suit the particular type of tie strings employed on the link meat product.

When a string of link meat product is passed through the de-stringer as above described, no injury is done to the casing in which the meat product is contained, nor is there any damage done to the meat product itself. Therefore, the destringed link meat product can be skinned by machines provided with means for inflating one end of the casing of the chain and simultaneously cutting the casing as the chain is passed through that machine. Such machines are well known in the art.

Having thus described the invention, what we claim as new and desire to secure by Letters Patent is:

1. For de-stringing chains of link meat products in a casing, a machine comprising a throat having an axial bore of larger cross-section than the cross-section of the links to be de-stringed, and shorter in length than one of said links, there being oppositely facing flared mouths at the ends of the throat, a slide rod, said throat being fixedly mounted on said slide rod with said bore extending perpendicular to the center line of said slide rod, a slide bearing adapted for supporting said slide rod for longitudinal reciprocation, and means for rapidly reciprocating said rod and throat at substantially right angles to the line of travel of a chain of link meat product as it passes through said bore, whereby a whipping motion is imparted to said chain, and the tie-strings are untied and drop off.

2. A device according to claim 1, characterized by the fact that the means for rapidly reciprocating said rod and throat comprises a shaft rotatable by power means, a crank fixed to said shaft for rotation therewith, a slotted plate secured to said slide rod having a slot therein extending perpendicular to the axis of said slide rod and adapted to receive said crank, whereby rotation of said shaft effects longitudinal reciprocation of said throat perpendicular to the axis thereof.

3. A device according to claim 1, characterized by the fact that the means for rapidly reciprocating said rod and throat comprises a rotatable shaft, a source of power adapted to rotate said shaft at a speed within the range of 340 revolutions per minute to 540 revolutions per minute, a crank having an effective radius of 1 to 2 inches fixed to said shaft for rotation therewith, a slotted plate secured to said slide rod having a slot therein extending perpendicular to the axis of said slide rod and adapted to receive said crank for cooperation to effect reciprocation of said slide rod, whereby rotation of said shaft effects reciprocation of said throat perpendicular to the axis thereof at a frequency and stroke adapted to de-string a chain of link meat product as same is passed through the bore in said reciprocating throat.

4. A device for removing tie strings from link meat products, such as sausage, wieners, frankfurters and the like, comprising a hollow throat member having flared ends, the length of said throat member being less than the length of a single link of said meat product, and means for reciprocating said hollow throat member at substantially right angles to the line of travel of a string of link meat product as it passes through said throat member, whereby a whipping motion is imparted to said string, and the tie strings are untied and drop off.

References Cited in the file of this patent

UNITED STATES PATENTS

| Number | Name | Date |
|---|---|---|
| 923,644 | Griggs | June 1, 1909 |
| 1,119,792 | Biesmeyer | Dec. 8, 1914 |
| 2,623,237 | Schaller | Dec. 30, 1952 |